Dec. 18, 1928.
R. P. JACQUES
1,695,496
METHOD OF MAKING GREASE CUPS
Filed June 7, 1927
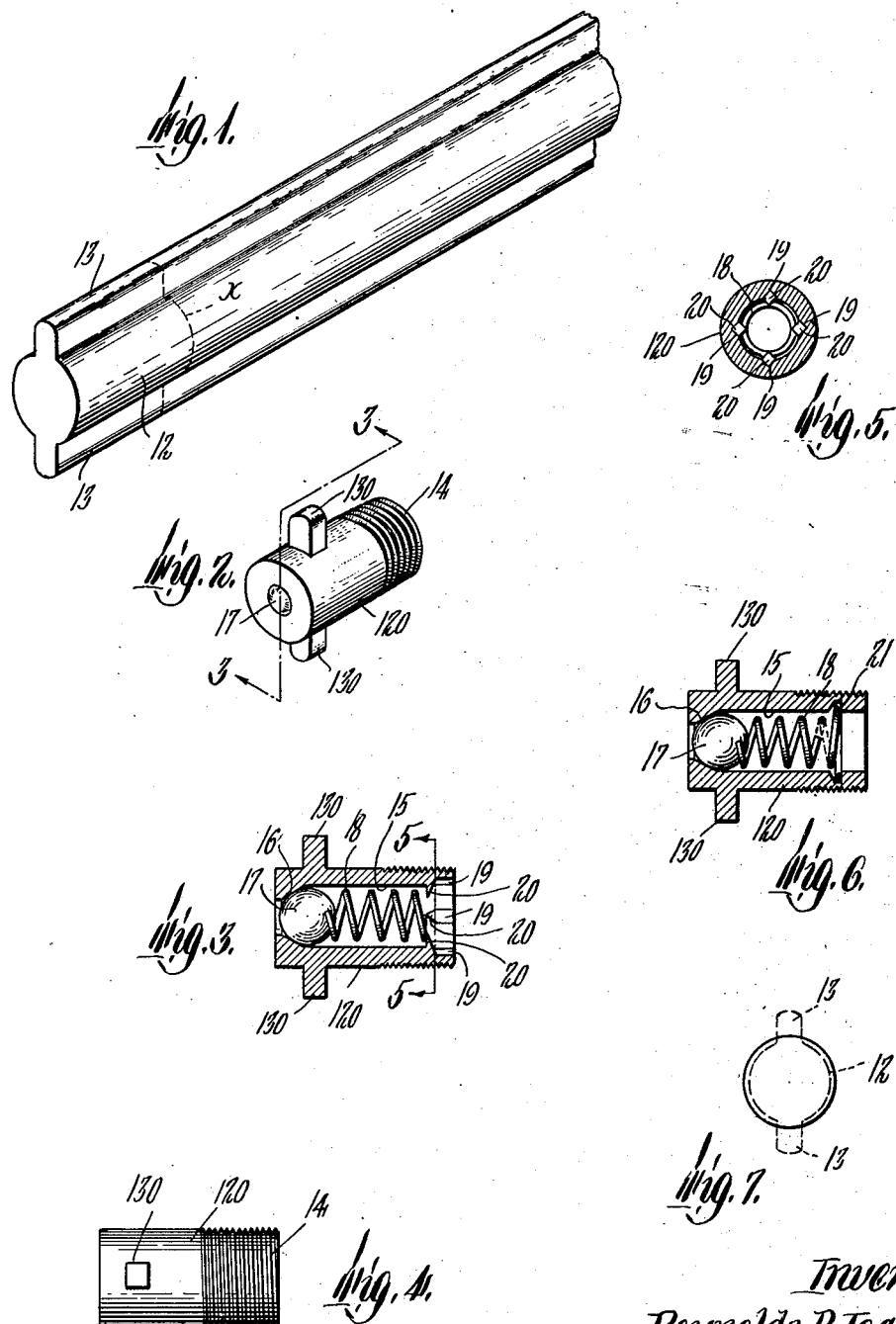
Inventor:
Raynaldo P. Jacques,
by Hughes Brown Quinby May
Attys.

Patented Dec. 18, 1928.

1,695,496

UNITED STATES PATENT OFFICE.

RAYNALDO P. JACQUES, OF WOONSOCKET, RHODE ISLAND, ASSIGNOR TO ADAMS INDUSTRIES, INC., OF NEW YORK, N. Y., A CORPORATION OF NEW YORK.

METHOD OF MAKING GREASE CUPS.

Application filed June 7, 1927. Serial No. 197,130.

This invention relates to a nipple-shaped grease cup attachable to a bearing to supplay a lubricant thereto, and provided externally with bayonet-joint studs adapted to be detachably engaged with complemental slots in the terminal of a flexible conduit communicating with a grease gun or pressure system.

The chief object of the invention is to provide a nipple-shaped grease cup, the body and bayonet-joint studs of which are made in a single piece, the studs being integral with the body.

Another object is to provide a nipple-shaped grease cup which includes a body, bayonet-joint studs integral with the body, and an abutment for the spring which closes the usual check valve at the receiving end of the body, said abutment being also integral with the body, so that the body, studs, and spring abutment, are formed in a single piece.

The advantages of this single piece construction will be stated hereinafter.

Of the accompanying drawings forming a part of this specification,—

Figure 1 shows in perspective a bar of indeterminate length from which a plurality of grease cups embodying the invention may be made.

Figure 2 shows in perspective a grease cup, the body and bayonet-joint studs of which are formed from a section of the bar shown by Figure 1.

Figure 3 is a section on the plane indicated by the line 3—3 of Figure 2.

Figure 4 is a side view of the grease cup shown by Figures 2 and 3.

Figure 5 is a section on line 5—5 of Figure 3.

Figure 6 is a view similar to Figure 5, showing a modification.

Figure 7 is a diagrammatic view showing by full lines an end of the bar shown by Figure 1 before the wings are formed thereon.

In carrying out my invention, I provide a bar of indeterminate length, a portion of which is shown by Figure 1. Said bar, which may be formed by suitably shaped rolls or otherwise, includes a substantially cylindrical body portion 12, and longitudinally extending wings 13, integral with the body portion, and projecting from opposite side portions thereof.

From the bar I sever at the point indicated by the broken line X (Figure 1), a blank of the length of a nipple-shaped grease cup, the blank being that portion of the bar shown by Figure 1, between the line X and the left-hand end of the bar. The blank therefore has a substantially cylindrical body portion and two longitudinal wings 13, extending from end to end of the body portion. The cross-sectional area of the blank is equal to that of a completed grease cup on a plane intersecting the bayonet-joint studs thereof.

The blank is then converted into the nipple-shaped grease cup shown by Figure 2, and including a substantially cylindrical body portion 120 and bayonet-joint studs 130, by the operations next described:

The wings are cut away from opposite ends of the blank until only the studs 130 remain, the studs being relatively near the end of the blank which constitutes the outer end of the cup. A screw thread 14 is cut on the opposite end portion of the blank, to engage a tapped socket in a bearing. The longitudinal central portion of the blank is cut out by a boring tool, to provide a bore 15, constituting the wall of a grease cavity. The outer end portion of the bore may be contracted to form a seat 16 for a check valve 17. The body 120 is provided with an abutment integral therewith for the spring 18 which presses the check valve against the seat. Said abutment is preferably provided by driving a square punch into the inner end of the bore 15, the size of the punch being such that its corners form furrows 19 (Figures 3 and 5) in the bore, and convert the metal displaced in forming the furrows into inwardly projecting spurs 20, collectively constituting an abutment for the inner end of the spring 18. These spurs may be formed after the valve and spring have been inserted in the bore. The abutment may be otherwise provided as by forming a groove 21 in the bore 15, one side of the groove facing toward the valve seat and constituting an abutment adapted to support an enlarged end convolution of the spring 18, as shown by Figure 6. Said convolution is compressible, so that it may be forced into the bore and spring outward into the groove.

It will now be seen that I have provided a nipple-shaped grease cup attachable to a bearing and having external bayonet-joint studs, all formed in a single piece, and that said piece may include an internal spring abutment.

The chief advantages of this one-piece construction are the following:

There is no liability of outward displacement of the studs by the pressure of grease packed and compressed in the bore by a grease-gun, and of leakage of the compressed grease around the studs. When the studs are separately formed and inserted in orifices formed for their reception in the wall of the cup, the pressure of the compressed grease sometimes forces the studs outwardly, and sometimes causes leakage of grease around the studs.

The studs cannot become loosened by their contact with the margins of bayonet-joint slots in a conduit terminal.

A square form is naturally imparted to the studs by the operation of cutting away the major portions of the wings 13. The studs thus formed are stronger and more durable than would be the case if they were cylindrical and driven into orifices in the cup wall.

The integral spring abutment cannot deviate from its predetermined position, and in the preferred form shown by Figures 3 and 5, may be provided quickly and inexpensively after the valve and spring are inserted in the bore.

The described method involves the making of a solid metal blank having material in excess of that required for the body 120 of the cup to be produced, the displacement of the excess metal, and the formation of the studs 130 from the displaced metal.

The margin of the blank as originally formed may be as shown by the full line in Figure 7. The margin, after the displacement of the excess metal, may be as indicated by the dotted line, said margin including the wings 13. The excess metal may be displaced by a rolling operation which forms the external surface of the body and elongated wings 13, said wings being subsequently reduced by cutting away their end portions to form the studs 130. It is obvious, however, that the excess metal may be displaced by a drop forging operation which also forms the studs 130, so that no removal of metal is required in forming the studs.

I claim:

1. The method of making a nipple-shaped grease cup, which consists in forming a one-piece bar of indeterminate length, including a substantially cylindrical body portion and longitudinally extending wings integral with the body portion and projecting from opposite side portions thereof, transversely severing said bar to form a blank for a single cup, removing portions of the wings from the blank to leave bayonet-joint studs on the body portion, screw-threading an end portion of the blank, and providing the blank with a longitudinal bore.

2. The method of making a nipple-shaped grease cup, which consists in forming a one-piece bar of indeterminate length, including a substantially cylindrical body portion and longitudinally extending wings integral with the body portion and projecting from opposite side portions thereof, transversely severing said bar to form a blank for a single cup, removing portions of the wings from the blank to leave bayonet-joint studs on the body portion, screw-threading an end portion of the blank, providing the blank with a longitudinal bore, and forming a spring abutment in said bore.

3. The method of making a nipple-shaped grease cup, which consists in forming a one-piece bar of indeterminate length, including a substantially cylindrical body portion and longitudinally extending wings integral with the body portion and projecting from opposite side portions thereof, transversely severing said bar to form a blank for a single cup, removing portions of the wings from the blank to leave bayonet-joint studs on the body portion, screw-threading an end portion of the blank, providing the blank with a longitudinal bore, and inwardly displacing portions of the metal forming the bore, to provide spurs constituting a spring abutment.

4. The method of making a nipple-shaped grease cup and bayonet joint studs thereon, which consists in first making a solid metal blank having material in excess of that required for the body of the cup, displacing the excess metal to form the external surface of the cup body and cause the displaced metal to protrude from opposite side portions thereof, forming bayonet joint studs from the displaced metal, and longitudinally boring the blank to form a grease cavity.

In testimony whereof I have affixed my signature.

RAYNALDO P. JACQUES.